April 25, 1961
C. J. STALEGO
2,980,952
APPARATUS FOR FORMING FIBERS
Filed Oct. 28, 1955
2 Sheets-Sheet 1
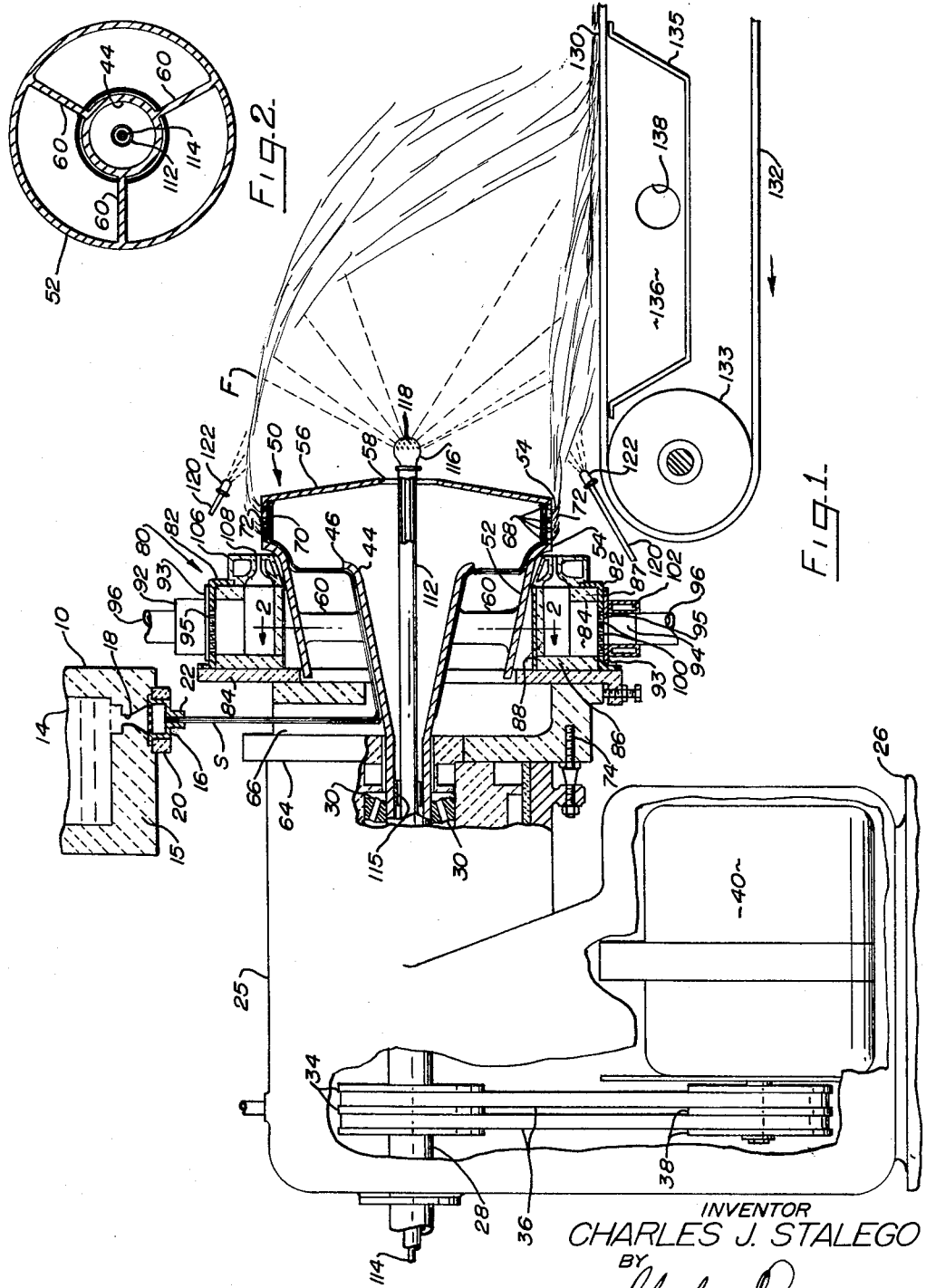
INVENTOR
CHARLES J. STALEGO
BY
ATTORNEYS.

April 25, 1961 C. J. STALEGO 2,980,952
APPARATUS FOR FORMING FIBERS
Filed Oct. 28, 1955 2 Sheets-Sheet 2

INVENTOR
CHARLES J. STALEGO
BY
ATTORNEYS.

United States Patent Office 2,980,952
Patented Apr. 25, 1961

2,980,952
APPARATUS FOR FORMING FIBERS
Charles J. Stalego, Newark, Ohio, assignor to Owens-Corning Fiberglas Corporation, a corporation of Delaware
Filed Oct. 28, 1955, Ser. No. 543,555
1 Claim. (Cl. 18—2.5)

This invention relates to apparatus for forming treating and collecting fibers and more specially to a method and apparatus for producing fibers from heat-softenable mineral material, such as glass, slag, fusible rock or the like, collecting the fibers and continuously conveying them away from the fiber-forming zone.

Heretofore it has been commercial practice to form glass fibers by engaging one or more gaseous blasts with vertical streams of molten glass wherein the blast attenuated fibers move downwardly or descend from the attenuating zone and are collected upon a substantially horizontal moving conveyor. Steam and compressed air blasts have been used for this purpose.

Another method heretofore used involves the steps of drawing glass streams into solidified rods or primary filaments and feeding the solidified material into a gaseous blast of a temperature above the attenuating temperature of the glass whereby the solidified rods or filaments are softened by the heat of the blast and the softened material attenuated to fibers by the velocity of the blast.

The method utilizing steam or compressed air blasts produces relatively coarse fibers and, while the hot blast method produces fine fibers, the later method is relatively expensive due to the substantial amounts of heat energy required to soften the solidified rods to an attenuating temperature.

Centrifugal means have been used to form elongated bodies projected horizontally and engaged by downwardly directed gaseous blasts whereby the bodies of glass are attenuated to fibers. The centrifugal means heretofore used for carrying out this method includes a cylindrical rotor having a periphery formed with small openings through which molten glass or other molten material is extruded in the form of elongated bodies by centrifugal force and the bodies delivered into the attenuating blast. Such arrangements require special means disposed within the rotor for distributing the vertical stream of molten material horizontally into contact with the rotor wall preparatory to the extrusion of the material through the openings.

This invention embraces forming molten glass or other fiber forming material into elongated bodies and attenuating the bodies to fibers by a high velocity gas stream whereby the fibers may be collected adjacent the fiber attenuating zone, the entire process being carried out in a minimum of space.

An object of the invention resides in directly forming molten fiber-forming material into primary filaments or elongated bodies moving outwardly from a horizontal axis and engaging the outwardly moving bodies with a horizontally directed high velocity blast to form fibers which may be advantageously collected in a mat formation upon a surface adjacent the attenuating zone.

Another object of the invention resides in a fiber-forming apparatus embodying a rotating element formed with a flared or frusto-conically shaped surface upon which a stream of molten material is delivered and formed by centrifugal force into bodies which are attenuated to fibers by a high velocity gaseous blast and wherein the bodies may be discharged from the element rotating about a vertical axis, horizontal axis or about an axis arranged in other angular positions.

Another object of the invention is the provision of an apparatus for attenuating bodies of fiber-forming material by an annularly shaped horizontally directed gaseous blast and a fiber coating material or binder delivered onto the newly formed fibers from means disposed within the zone defined by the annular blast whereby the coating material or binder is dispersed onto the fibers to provide for the homogeneous distribution of the binder or coating material in and throughout the mat of fibers.

Another object of the invention is the provision of a fiber-forming apparatus wherein the fibers are formed by means moving in directions whereby a reduction is effected in the space required for the apparatus utilized for carrying on the method.

Another object of the invention is the provision of rotatable means for forming fibers by centrifugal forces in which the rotatable means is of comparatively small diameter adapted to rotate at extremely high speeds whereby fibers may be formed directly from a molten fiber-forming material.

Another object of the invention embraces a method and apparatus wherein molten fiber-forming material may be deposited upon a flaring surface of a member rotating at high speed and discharged therefrom by centrifugal forces in the form of fibers or linear bodies which may be further attenuated to finer fibers by an attenuating blast.

Still another object is the provision of comparatively small and compact fiber-forming units which may be arranged in close proximity in groups whereby a fibrous mat of desired width may be formed by concomitantly collecting the fibers formed by the several units without the employment of special means for effecting distribution of the fibers.

Still another object of the invention is the provision of a fiber collecting means which may be disposed adjacent the fiber attenuating region and wherein a subatmospheric pressure is established adjacent the fiber collecting surface to foster the collection of the fibers without impairing their natural orientation in an attenuating blast and for conveying away the spent gases of the blast.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view of a form of apparatus of the invention for forming and collecting fibers, certain parts being shown in section;

Figure 2 is a transverse sectional view taken substantially on the line 2—2 of Figure 1.

Figure 3:
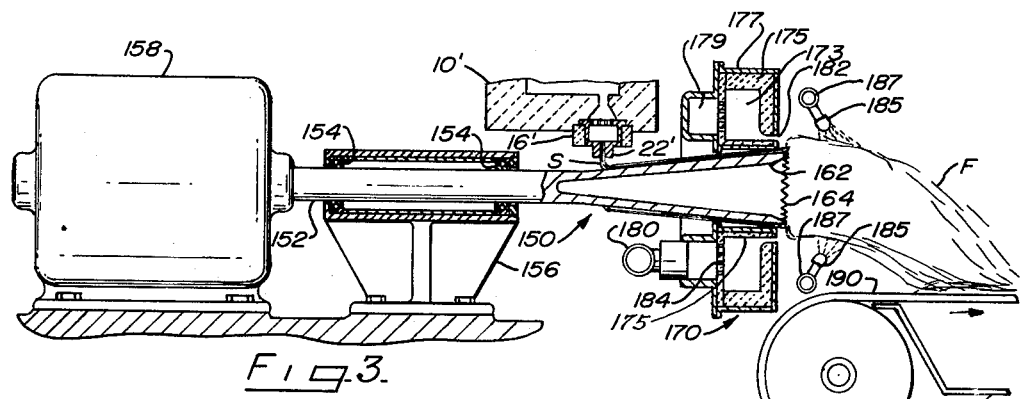
Figure 3 is a vertical sectional view showing another form of apparatus for carrying out the method of the invention.

While the method and apparatus of the invention are particularly usable for forming fibers from glass, it is to be understood that the arrangement may be used for forming fibers from other materials, such as slag, fusible rock, plastics, resins or the like.

Referring to the drawings in detail Figures 1 and 2 illustrate one form of apparatus of the invention. In Figure 1 there is shown a forehearth 10 which is associated or connected with a melting furnace or receptacle (not shown) in which glass batch or other heat-softenable fiber-forming material is reduced to a flowable condition by the application of heat providing a supply of molten material 14 in the forehearth.

Secured to the bottom wall or floor 15 of the forehearth is a feeder or bushing 16 adapted to receive molten material through a passage 18 in the floor 15. The feeder is secured to the forehearth 10 by means of a supporting ring or block 20. The feeder 16 is formed with a projection or tip 22 having an orifice or outlet through which flows a stream S of fiber-forming material which is delivered to a fiber-forming apparatus.

The fiber-forming apparatus includes a rotor or member adapted for rotation about a substantailly horizontal axis for projecting bodies of the molten material endwise into a high velocity gas stream or attenuating blast. The apparatus includes a frame or housing 25 which may be mounted upon a suitable support 26. A hollow shaft 28 disposed in a substantially horizontal position is mounted in bearings 30 carried by the housing structure 25. The hollow shaft 28 is equipped with sheaves 34 which are connected by driving belts 36 with sheaves 38 driven by a suitable motor 40 or other source of power. The motor 40 may be adjustably mounted by means (not shown) for regulating the tension of the driving belts 36. The speed of rotation of the shaft 28 may be varied by employing sheaves of different diameters or a variable speed changing mechanism of conventional character may be used.

The cylindrical portion of the shaft 28 is integrally joined with a flared or frusto-conically shaped portion 44 which terminates in an outwardly extending flange 46 and forms a component or part of the rotor construction or spinner 50. The rotor or rotatable member 50 is inclusive of a frusto-conically shaped or flared portion 52 spaced from the frusto-conically shaped portion 44 of the shaft 28, the portion or wall 52 being joined with a peripheral circular cylindrical wall 54.

The rotor is formed with an end wall 56 integrally joined to the peripheral wall 54, the end wall 56 being formed with a central circular opening 58. As shown in Figure 2, the frusto-conically shaped wall 52 is integrally joined with the wall 44 by means of spokes or ribs 60.

Secured to the housing 25 is a plate or member 64 formed with a passage 66 through which flows the stream S of glass or other fiber-forming material into contact with the exterior surface of the frusto-conically shaped element 44. The peripheral wall 54 of the rotor 50 is formed with a large number of small orifices or openings 68 through which molten glass or other mineral material is extruded under the influence of centrifugal forces to form elongated bodies, fine streams or filaments of the molten material.

Due to the centrifugal forces arising by rotation of the shaft 28, portion 44 and the rotor 50, the glass of the stream S engaging the flaring or frusto-conically shaped wall 44 moves outwardly of the axis of rotation and upwardly along the wall 44 as shown in Figure 1. The molten material is then abruptly deflected or diverted outwardly by the flange 46 whereby the molten material impinges upon the surface 52 and traverses the surface outwardly of the axis of rotation and collects in a film or layer 70 in a material distributing zone defined by the circular wall 54. The molten material collected at 70 in the rotor flows outwardly through the orifice 68 to form fine streams, elongated bodies or primaries 72 of the material which are attenuated to fine fibers by a high velocity gaseous blast.

The plate 64 is secured to the housing 25 by means of stud bolts 74 and a blast establishing means or burner 80 is supported by the plate. As particularly shown in Figure 1 the burner or blast producing means 80 is formed with a metal casing 82 which is secured to a plate 84, the latter being connected to the plate 64 by suitable means (not shown).

The burner 80 is preferably formed with a plurality of radially arranged burner units including combustion chambers or confined zones 84 which are symmetrically disposed about the axis of the shaft 28. Each of the combustion chambers or zones 84 is defined or bounded by vertically arranged partitions (not shown) and walls 86, 87 and 88. The walls 86, 87 and 88 are formed of high temperature refractory to resist the elevated temperatures of the burning gases within the chambers.

Secured to the peripheral region of the burner and adjacent each of the combustion chambers or units is a manifold construction 92 containing a chamber 94. Each of the manifold chambers 94 is connected by means of a tube or duct 96 with a supply of combustible mixture for delivery into the combustion chambers. Each manifold casing 92 is substantially rectangular and is mounted on or carried by a plate 93 which is bolted or otherwise secured to the metal casing 82. The manifold construction may be a continuous pipe or chamber in communication with the combustion chambers at spaced zones.

An outer wall 95 of each of the combustion chambers 84 is formed with a plurality of small openings 100 through which mixture from the manifold chamber 94 is conveyed into the adjacent combustion chamber. The perforated zone of the wall 95 forms a protective fire screen to prevent preignition of the mixture in the manifold or supply pipe.

Each of the manifolds is preferably surrounded with a cooling jacket or chamber 102 through which water or other temperature controlling fluid may be circulated to cool the manifold.

The fuel component of the combustible mixture may be a fuel gas, such as ethane, methane or propane, the fuel being mixed with the requisite amount of air to support combustion. The combustible mixture is introduced into the combustion zones under comparatively low pressures of from three to ten pounds per square inch. A valve means (not shown) may be provided for each of the mixture supply pipes 96 for controlling the delivery of combustible mixture into each of the combustion units.

The burner construction 80 is provided with orifice means for discharging burned gases or products of combustion from the combustion chambers 84 as an intensely hot high velocity blast of a temperature above the attenuating temperature of the glass or other fiber-forming material. The burning gases in the chambers 84 attain temperatures of upwards of 3000° F. or more. The orifice construction is inclusive of a member 106 provided with restricted orifices or outlets 108 through which the burning gases from the combustion chambers are discharged to form the blast.

The orifices 108 associated with the combustion chambers 84 are arranged in a substantially annular pattern or relation to provide a substantially annularly shaped blast projected horizontally and in substantially concentric relation with and adjacent to the peripheral wall 54 of the rotor 50. The elongated bodies, streams or primaries 72 of the glass or other fiber-forming material extruded from the orifices 68 in the circular wall 54 are delivered or projected endwise into the annular blast of intensely hot gases emanating from the orifices 108, the blast attenuating the material into fine fibers F which move for a comparatively short distance away from the rotor in a hollow column or beam formation substantially concentric with the periphery of the spinner 50.

The gases of the blast moving away from the source or orifice 108 gradually expand and the velocity is reduced so that the fibers may readily be collected upon a suitable surface.

The rotor or spinner 50 is revolved at a speed to establish centrifugal forces adequate to extrude the molten glass or other material through the orifices 68 in the spinner so that the fine streams, primaries or elongated bodies 72 are projected outwardly of the peripheral wall of the rotor and enter the blast in directions substantially normal to the blast. It has been found that a spinner or rotor of from seven to nine inches in diameter should be rotated at three throusand revolutions per minute or more in order to properly extrude the molten material through the openings or orifices 68. The stream of material S should be of sufficient size and its delivery at a rate sufficient to maintain an annular film or layer of the molten material over the entire interior region of the openings 68 in order to assure extrusion or delivery of uniform streams, primary filaments or elongated bodies from all of the openings in the spinner wall.

The arrangement of the invention is inclusive of a means of conveying a lubricant, binder or other fiber coating material through the rotor and dispersing or distributing the same onto the fibers while they are entrained in the blast. Extending through the interior of the hollow shaft 28 is a binder or fiber coating conveying means in the form of a tube or pipe 112 within which is disposed a second tube or pipe 114. The tubes 112 and 114 are relatively stationary.

Bearing members or sleeves 115 may be disposed between the tube or pipe 112 and the interior surface of the hollow shaft 28 to properly maintain the tube 112 at the axis of rotation of the shaft 28 and rotor 50. The binder conveying means extends through the hollow shaft 28 and through the opening 58 in the end wall 56 of the rotor and is provided with an applicator or nozzle construction 116 having orifices 118 through which the lubricant, binder or coating material is sprayed or distributed onto the fibers F.

The binder may be conveyed to the applicator through the tube or pipe 114 and a fluid vehicle, such as compressed air, may be conveyed to the applicator through the annular chamber provided between the interior wall surface of the pipe 112 and the exterior surface of the pipe 114. The compressed air entrains the binder or coating material in the applicator 116 and carries the binder or material through the orifices 118 onto the fibers.

For certain uses it is desirable to coat the fibers with a lubricant, such as mineral oil or the like, and it may be distributed or sprayed onto the fibers in the manner above described. When it is desired to form a mat of the fibers having a degree of mass integrity or to bond the fibers together a thermosetting or a thermoplastic binder may be used. Thermosetting binders are preferred and materials such as phenolformaldehyde or ureaformaldehyde have been found to be satisfactory.

When a thermosetting binder is applied, the binder impregnated mat of fibers is conveyed through a suitable heating zone or oven (not shown) for setting the binder. By conveying the lubricant, binder or other coating material through the rotor and applying the material to the beam or annular formation of fibers from an interior central zone, the natural orientation of the fibers in the beam is not impaired or disturbed.

If desired, lubricant, binder or coating material may be applied exteriorly of the beam of fibers. As shown in Figure 1, pipes or tubes 120 equipped with applicators 122 may be spaced circumferentially of the beam of fibers exteriorly thereof for the purpose.

Arranged forwardly of the rotor 50 and adjacent the path of flight of the attenuated fibers is a means for collecting the fibers into a mass or mat formation. As shown in Figure 1, the fibers are collected upon the upper flight 130 of an endless conveyor 132 of the foraminous or reticulated type which is supported upon rollers 133, one of which is shown. The conveyor may be driven by a motor (not shown) or any suitable means.

A box or receptacle 135 is disposed beneath the upper flight of the conveyor and in registration with the path of the descending fibers and provides a chamber 136 connected by a tube or pipe 138 with a suction blower or other means of obtaining reduced or subatmospheric pressure in the chamber 136. The suction or reduced pressure in the chamber 136 assists in collecting the fibers upon the conveyor and carries away spent gases of the attenuating blast.

The operation of the apparatus of Figures 1 and 2 is as follows: The stream S of molten glass or other flowable fiber-forming material is delivered onto the exterior surface of the cone-shaped portion 44 of the hollow shaft 28, the latter being rotated at a comparatively high speed by the motor 40. The material of the stream engaging the rotating cone-shaped surface adheres to the surface and, under the influence of centrifugal forces, flows or moves outwardly of the axis of rotation along the exterior surface of the flared portion or cone 44 until it engages the flange 46.

The path of the molten material is modified and diverted by the flange 46 the material being projected outwardly by centrifugal forces of rotation and away from the flange 46 into engagement with the interior surface of the flaring wall 52, the material moving along the flaring wall into contact with the circular wall 54. The outwardly moving material collects upon the interior of the rotor wall 54 forming an annular layer of film 70 of material covering the orifices or openings 68 in the wall 54.

The molten glass or other material, under the influence of centrifugal forces, is extruded or projected through the orifices or openings 68 forming fine streams, primary filaments or elongated bodies 72 which enter the annular gaseous blast emanating from the orifices 108, the material being attenuated to fine fibers by the heat and velocity of the blast. The blast entrains and conveys the fibers away from the attenuating zone and, as the velocity of the blast diminishes, the fibers descend by gravity onto the conveyor flight 130 assisted by the suction or reduced pressure existent in the chamber 136.

It is to be understood that the burner or blast producing arrangement may be constructed to provide single substantially annular combustion chamber or confined zone functioning in conjunction with an annularly shaped restricted orifice through which the burned gases or products of combustion may be discharged as an uninterrupted annular blast. The binder may be delivered onto the fibers interiorly of the beam of fibers or exteriorly thereof or simultaneously from both zones onto the fibers. The arrangement illustrated in Figure 1 effects attenuation of the fibers in an open zone, but a hood or other enclosure may be employed at the fiber-forming and collecting zone if desired.

It should be noted that the forehearth 10 may be positioned close to the fiber-forming unit and due to the attenuation operation being carried on in substantially horizontal directions, the arrangement is quite compact effecting a substantial saving in space requirements for the fiber-forming and collecting operations.

Figure 3 illustrates a modified form of apparatus for carrying out the method of the invention. The rotor or rotatable member 150 is formed with a shaft portion 152 journalled in suitable bearings 154 mounted in a support or housing 156, the shaft 152 being driven by a motor 158. The rotor 150 is formed with a flared or frusto-conically shaped portion or section 162. The angle of taper of the flared portion 162 relative to the axis of rotation is relatively small and is preferably from one to ten degrees depending upon the speed of rotation. The end zone of the flared portion may be serrated as shown at 164 to facilitate the outward distribution of fiber-forming material into elongated bodies.

Disposed above and close to the rotor 150 is a forehearth 10' which contains a supply of molten glass or other heat-softened fiber-forming material. The forehearth 10' is provided with a feeder or bushing 16' having a downwardly extending projection or tip 22' formed with an orifice through which flows a stream S of glass or other molten material. The stream S is delivered onto the flared or frusto-conically shaped portion of the rotor at the zone of small diameter as shown in Figure 3.

The rotatable member 150 is continuously rotated and acquires a layer or film of glass from the stream through a shearing action. Centrifugal forces set up by rotation of the rotor 150 causes the molten glass or other material to be moved along the flared surface of the rotor in the direction of the progressively increasing diameter thereof, and is discharged outwardly of the end of the rotor as shown in Figure 1.

The arrangement shown in Figure 3 includes a rotor construction of relatively small diameter and the discharge end of the flared portion of the rotor may be one-half inch or less in diameter. The rotor is adapted to be rotated at extremely high speeds of, for example, fifty thousand to one-hundred-fifty thousand revolutions per minute or more. A rotor of small diameter may be rotated at relatively high speeds without liability of fracture or breakage of the rotor by centrifugal forces. The molten glass or other molten material delivered onto the flared surface of the rotor tends to cling or adhere to the flared surface and to move outwardly toward the progressively larger diameter and, upon reaching the end zone, is projected outwardly of the end of the rotor in a plane normal to the axis of rotation by centrifugal forces and the movement of more glass along the flared or conically-shaped surface toward the discharge end of the rotor.

The glass is dispelled from the end of the rotor in the form of linear bodies or fibers as the high speed of rotation is sufficient to cause the projection of the material at a rate of speed such as to effect substantial attenuation of the bodies leaving the rotor as to directly form fibers or filaments. These may be collected in any suitable manner.

It is, however, desirable to produce finer fibers than are attainable solely from centrifugal attenuation of the molten fiber-forming material. In order to obtain fine fibers the arrangement illustrated in Figure 3 includes a burner or blast producing means 170 which is adapted to provide a high velocity gaseous blast of a temperature above the attenuating temperature of the fiber-forming material. The burner 170 is of a construction similar to the burner 80 shown in Figure 1 but of a much smaller size. The burner shown in Figure 3 includes a combustion chamber 173 of generally annular configuration defined by refractory walls 175 and enclosed within a metal casing 177.

The burner is provided with an annular manifold 179 which receives a combustible mixture from a supply through a duct or pipe 180. The burner is formed with a restricted orifice 182 of generally annular configuration disposed substantially concentric with the axis of the rotor 150. The combustible mixture in the manifold 179 is delivered into the combustion chamber or zone 173 through the orifices or openings in the perforated wall 184 defining the rear wall of the burner chamber. The combustible mixture is introduced into the combustion zone under comparatively low pressure, preferably between three to ten pounds per square inch, the mixture being substantially completely burned in the chamber 173.

The intensely hot products of combustion at temperatures of upwards of 3000° F. well above the attenuating temperature of the glass are discharged through the restricted orifice 182 as an intensely hot high velocity annular blast. The blast engages the outwardly moving fibers or bodies discharged from the end zone of the flared portion of the rotor and are attenuated by the blast to form very fine fibers.

It may be desirable to distribute a bonding agent or binder onto the newly formed fibers and this may be accomplished by providing applicators or nozzles 185 adapted to project or spray binder onto the newly formed fibers. The binder may be conducted to the applicators through manifolds or supply tubes 187. The fibers F may be collected upon the upper flight 190 of a conveyor 191, the reduced pressure in a suction box 192 disposed beneath the fiber collecting zone of the conveyor assisting in the deposition of the fibers upon the conveyor and disposing of the spent gases of the blast.

Figure 4:
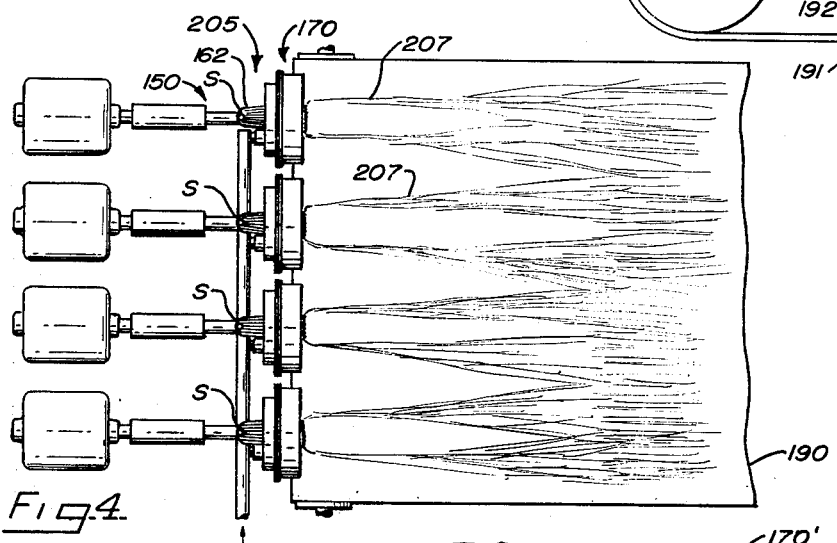
Figure 4 is a top plan view showing a plurality of fiber forming units utilized for forming a fibrous mat of substantial width.

Figure 4 is illustrative of a group or battery of fiber-forming units of the character shown in Figure 3 wherein the units are arranged in close proximity one with another for producing a mass or mat of fibers of predetermined width. The fiber-forming units are illustrated at 205 and the streams S of glass are delivered onto the flared portions 162 of the rotors 150. The units are placed in transverse alignment as shown in Figure 4, each unit delivering a beam 207 of fibers onto the upper flight 190 of the foraminous conveyor 191.

Through the provision of a group of the fiber attenuating units, the fibers formed by the several units are concomitantly collected so as to provide a fibrous mass or mat of predetermined width and the collection of fibers takes place without impairing or disturbing the natural orientation of the fibers entrained in the blasts.

As the rotors 150 may be operated at extremely high speeds, a substantial amount of glass may be converted into fibers by reason of the rapid delivery or discharge of the fiber-forming material from the rotors and the immediate blast attenuation of the material to fine fibers.

Figure 5:
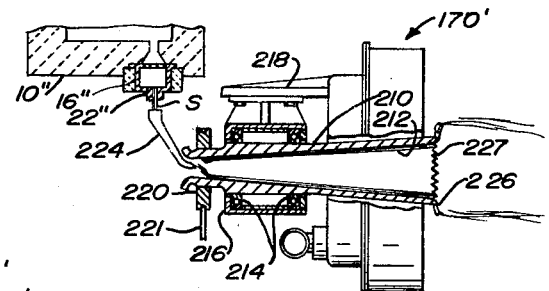
Figure 5 is a vertical sectional view of a modified form of apparatus for carrying out the method of the invention.

Figure 5 is illustrative of a modified form of apparatus for carrying out the method of the invention. In this form the rotor 210 is formed with an interior surface 212 of flaring or frusto-conical shape. The rotor is supported in antifriction bearings 214 carried within a bearing cage or housing 216 mounted upon a support 218. The rotor 210 is equipped with a sheave or pulley 220 driven by a belt 221 from a motor (not shown) or other source of power. The rotor is of comparatively small diameter, the large end of which may be one-half inch or less in diameter and is adapted to be rotated at extremely high speeds.

A forehearth 10" is provided with a feeder or bushing 16" equipped with a tip or projection 22" formed with an orifice through which flows a stream S of glass or other molten fiber-forming material. The glass stream is delivered into a spout or trough 224, the end of which projects into the zone of smallest diameter of the rotor 210 whereby the molten glass is delivered into the interior of the rotor.

Under the influence of centrifugal forces of high speed rotation, the glass or other molten material introduced at the small end of the rotor moves progressively toward the end of large diameter along the frusto-conically shaped surface 212. The molten material adjacent the large end of the rotor is discharged outwardly by centrifugal forces in a plurality of linear bodies, filaments or fibers 226. The end zone of discharge of the rotor may be serrated as shown at 227 in order to facilitate the formation of the glass into linear bodies.

A burner 170' of the same construction as burner 170 shown in Figure 3 is disposed adjacent to and surrounding the rotor 210 and is adapted to establish an annular blast of intensely hot gases which are discharged from the combustion chamber of the burner through a restricted orifice. The gaseous blast engages the outwardly moving bodies projected from the end of the rotor 212 to attenuate them to fine fibers which may be collected in the manner illustrated in Figure 3 or by other suitable means.

While the rotors illustrated in Figures 3, 4 and 5 are disposed for rotation about horizontal axes, it is to be understood that they may be disposed for rotation about upwardly or downwardly inclined axes or any position in which the molten material may be delivered onto the flared exterior or interior surfaces of the rotors.

Figure 6:
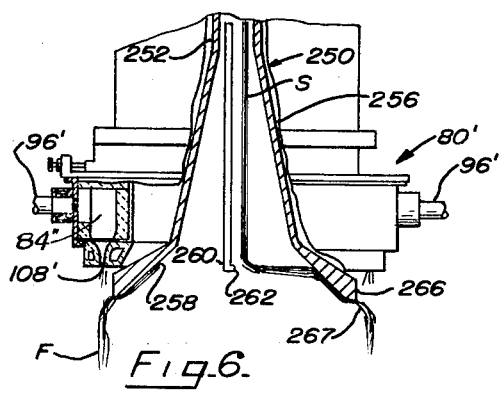
Figure 6 is a vertical sectional view showing another form of apparatus for carrying out the method of the invention.

Figure 6 illustrates a form of apparatus for attenuating molten glass or other heat-softened material to fibers wherein the rotor having a flared or frusto-conical configuration is particularly adapted for rotation about a vertical axis. The rotor 250 is of hollow configuration to receive a glass stream S delivered into the interior of the rotor from a feeder or bushing of the character shown in Figure 1. The cylindrical or shaft portion 252 of the rotor may be equipped with sheaves driven from a motor in the manner as illustrated in the apparatus as shown in Figure 1 with exception that the motor and rotor rotate about vertical axes.

The rotor 250 is formed with a flared or frusto-conically shaped configuration 256 which is joined with another flared or frusto-conically shaped surface portion 258 of greater taper or angularity with respect to the axis of the rotor. The arrangement shown in Figure 6 includes a means for directing or distributing the glass of the stream S into engagement with the flared surface 258 of the rotor. A tube or pipe 260 extends downwardly through the interior of the rotor and is equipped with a nozzle construction or jet 262 adapted to discharge a jet or blast of compressed air or other fluid.

The blast of gas from the nozzle 262 moves in a direction substantially normal to the path of flow of the stream S, the blast engaging the stream of glass conveying the same laterally or horizontally into contact with the surface 258 forming a film or layer of molten glass upon the surface 258. The rotor may be operated at comparatively high speed and the molten glass or other fiber-forming material delivered onto the surface is moved outwardly of the axis of the rotor under the influence of centrifugal forces. The molten material reaching the end zone 266 of the rotor is discharged outwardly in the form of a plurality of elongated bodies or primary filaments 267.

The bodies are projected into an attenuating blast emanating from a burner 80' of the character shown in detail in Figure 1. A combustible mixture delivered into the annular combustion chamber 84' through the mixture inlet pipes 96' is substantially completely burned within the chamber and the products of combustion discharged through the restricted orifice 108' as an intensely hot high velocity gaseous blast of a temperature above the softening or attenuation temperature of the glass or other fiber-forming material.

The orifice construction 108' is of generally annular shape providing an annular blast which is directed downwardly adjacent the periphery or end zone 266 of the rotor 250 and engages and attenuates the outwardly moving bodies into fine fibers F. The surface zone 266 of the rotor from which the material is discharged may be of uninterrupted or smooth contour or the surface may be serrated or radially grooved to form channels for the bodies of material extruded or projected outwardly from the end of the rotor. The rotor of this character may be made of relatively small or of large diameter depending upon the speed at which it is desired to operate the rotor and the character and size of fibers to be formed.

In the operation of this form of apparatus the glass stream S flows in a vertical direction into the interior of the rotor and the air blast from the nozzle 262 conveys the molten glass or fiber-forming material laterally or horizontally into the engagement with the flared surface 258 of the rotor. The rotation of the rotor establishes or creates centrifugal forces which are effective on the molten glass distributed on the surface 258 to cause the glass to move to the zone of greatest diameter viz. the zone 266 of the rotor from which the material is extruded or projected outwardly. The blast from the orifice 108' engages the outwardly moving bodies and attenuates the bodies to fine fibers. The fibers may be collected upon a conveyor of the character shown in Figures 1, 3 and 4 or by any other suitable fiber collecting means.

The zone or region of the external flared or conically shaped rotor surface at which the molten glass or other molten material will be dispelled or thrown outwardly therefrom is dependent upon a correlation of the following conditions or factors, viz. the degree of taper or angularity of the flared surface with respect to the axis of rotation, the radial distance or dimension of the flared surface from the axis of rotation, the speed of rotation of the rotor and the viscosity of the molten material. For example, if a rotor having a flared surface of substantial taper and of comparatively large diameter is rotated at a relatively high speed and the glass is of low viscosity, the glass may be dispelled or discharged from the flared surface at a region spaced from the end thereof. Under the same operating conditions, a glass of higher viscosity may adhere to the flared surface and progress along the surface and is not dispelled until it reaches the end zone of greatest diameter of the flared surface.

The degree of taper of the flared surface, its radial distance from the axis of rotation and speed of rotation are factors determining the centrifugal forces effective to dispel the molten material from the flared or conically shaped surface. The surface tension of the molten material tending to resist separation from itself and causing it to cling or adhere to the flared surface are factors that oppose the action of centrifugal forces to project the material from the flared surface. The surface tension of molten glass and other molten mineral material varies with the viscosity characteristics. Therefore, the point or region of the flared or conically shaped exterior surface at which the molten material is dispelled or thrown outwardly from the surface is that point or region at which centrifugal forces exceed the surface tension in the material. In those forms of the invention disclosed wherein the molten material is delivered onto an exterior flared surface to be discharged from the end of the flared surface, the factors above mentioned are correlated so that the centrifugal forces do not exceed the surface tension of the material until the material reaches the end zone of the flared surface at its largest diameter. It is to be understood that the material may be discharged outwardly from the exterior flared surface at other regions along its length by modifying the factors of centrifugal force and surface tension.

While the apparatus illustrated as especially adapted to establish and direct a gaseous blast of products of combustion at temperatures of upwards of 3000° F. well above the attenuating temperature of the material, it is to be understood that gaseous attenuating blasts such as steam, compressed air or other fluid may be utilized as an attenuting medium for forming fibers from the material projected from the rotor by centrifugal forces. The fibers formed by hot blast attenuation are relatively much finer in size than those formed by the use of attenuating blasts at temperatures below the attenuating temperature of the fiber-forming material.

It is apparent that, within the scope of the invention, modifications and different arrangements may be made other than is herein disclosed, and the present disclosure is illustrative merely, the invention comprehending all variations thereof.

I claim:

Apparatus of the character disclosed, in combination, a hollow rotor formed with a frusto-conically shaped surface and a circular cylindrical surface of larger diameter than the frusto-conically shaped surface and arranged for rotation about a substantially horizontal axis, said cylindrical surface being provided with circumferentially spaced orifices, means for delivering heat-softened mineral material onto a region of small diameter of the frusto-conically shaped surface, means for rotating the rotor about the axis of the surfaces whereby the material is advanced along the frusto-conically shaped surface and discharged radially therefrom into engagement with the interior of the cylindrical surface and through the orifices by centrifugal forces of rotation, means for establishing a high velocity, annularly shaped gaseous blast concentric with and exteriorly of the cylindrical surface with the gases of the blast moving in directions normal to the streams of material delivered through the orifices and engaging the material of the streams to attenuate the material to fibers, a tube extending through the hollow rotor and forwardly of the cylindrical surface adapted to convey fiber coating material, and nozzle means mounted by said tube for spraying coating material onto the fibers while in flight in the blast.

References Cited in the file of this patent

UNITED STATES PATENTS

| | | |
|---|---|---|
| 2,238,204 | Woods | Apr. 15, 1941 |
| 2,294,588 | Von Pazsiczky | Sept. 1, 1942 |
| 2,609,566 | Slayter et al. | Sept. 9, 1952 |
| 2,614,619 | Fuller | Oct. 21, 1952 |
| 2,624,912 | Heymes et al. | Jan. 14, 1953 |
| 2,682,079 | Richardson | June 29, 1954 |
| 2,707,847 | Anliker | May 10, 1955 |
| 2,839,782 | Tillotson | June 24, 1958 |